US009821832B2

(12) United States Patent
Davignon et al.

(10) Patent No.: US 9,821,832 B2
(45) Date of Patent: Nov. 21, 2017

(54) FABRIC WITH ELECTRICAL FUNCTION ELEMENT

(71) Applicant: W.E.T. Automotive Systems AG, Odelzhausen (DE)

(72) Inventors: Oliver Davignon, München (DE); Gábor Panyi, Budapest (HU)

(73) Assignee: GENTHERM GMBH, Odelzhausen (DE)

( * ) Notice: Subject to any disclaimer, the term of this patent is extended or adjusted under 35 U.S.C. 154(b) by 1021 days.

(21) Appl. No.: 13/792,887

(22) Filed: Mar. 11, 2013

(65) Prior Publication Data

US 2014/0175078 A1 Jun. 26, 2014

(30) Foreign Application Priority Data

Dec. 20, 2012 (DE) ........................ 10 2012 024 903

(51) Int. Cl.

| | |
|---|---|
| ***B60L 1/02*** | (2006.01) |
| ***B62D 1/06*** | (2006.01) |
| ***B32B 3/06*** | (2006.01) |
| ***B32B 5/26*** | (2006.01) |
| ***B60N 2/56*** | (2006.01) |
| ***B60N 2/58*** | (2006.01) |
| ***B60N 2/00*** | (2006.01) |
| ***B60N 2/24*** | (2006.01) |

(52) U.S. Cl.

CPC ................ *B62D 1/065* (2013.01); *B32B 3/06* (2013.01); *B32B 5/26* (2013.01); *B60N 2/002* (2013.01); *B60N 2/24* (2013.01); *B60N 2/5678* (2013.01); *B60N 2/5891* (2013.01); *Y10T 428/197* (2015.01)

(58) Field of Classification Search

CPC .. B62A 1/065; B32B 3/06; B32B 5/26; B60N 2/5678; B60N 2/5891; B60N 2/002; B60N 2/24; Y10T 428/197

See application file for complete search history.

(56) References Cited

U.S. PATENT DOCUMENTS

| | | | |
|---|---|---|---|
| 1,475,912 | A | 11/1923 | Williams |
| 2,978,972 | A | 4/1961 | Hake |
| 3,287,684 | A | 11/1966 | Armbruster |
| 3,448,246 | A | 6/1969 | Armbruster |
| 3,721,799 | A | 3/1973 | Carlstrom |

(Continued)

FOREIGN PATENT DOCUMENTS

| | | |
|---|---|---|
| DE | 3513909 | 10/1986 |
| DE | 3938951 A1 | 5/1990 |

(Continued)

OTHER PUBLICATIONS

Automotive Heated Seats—Heated Steering Wheels, IGB Automotive Ltd., received by Assignee W.E.T. Automotive Systems, May 2003.

(Continued)

*Primary Examiner* — Shawntina Fuqua

(74) *Attorney, Agent, or Firm* — The Dobrusin Law Firm, P.C.; Daniel P. Aleksynas

(57) ABSTRACT

The present invention relates to a fabric (30, 31) with at least one support (41, 41'), with at least two electrical function elements (70), and with at least one seam (40).

Figure 1:
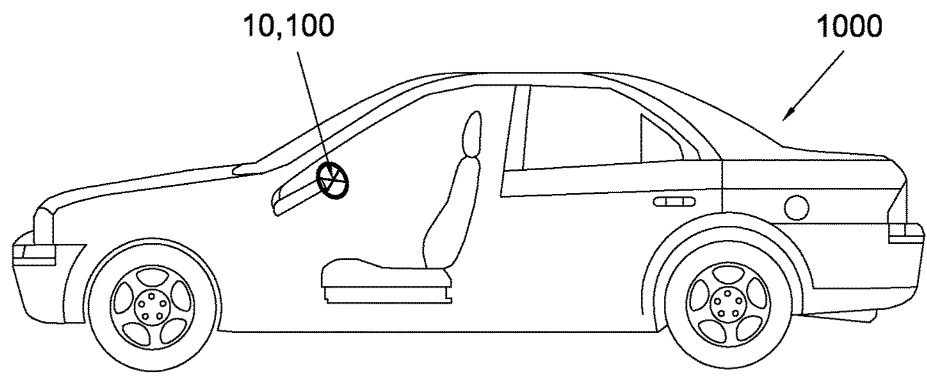

It is provided that at least two of the electrical function elements (70) are in the form of strands and integrated in the seam (40).

20 Claims, 1 Drawing Sheet

10,100

1000

(56) References Cited

U.S. PATENT DOCUMENTS 3,877,788 A 4/1975 Spargue et al.
3,892,946 A 7/1975 Rimmi
4,032,752 A 6/1977 Ohmura et al.
4,044,221 A 8/1977 Kuhn
4,149,066 A 4/1979 Niibe
4,245,149 A 1/1981 Fairlie
4,335,725 A 6/1982 Geldmacher
4,399,347 A 8/1983 Schmitt
4,410,790 A 10/1983 Berf et al.
4,436,986 A 3/1984 Carlson
4,523,085 A 6/1985 Grise
4,533,821 A 8/1985 Sato
4,539,051 A 9/1985 Hacias
4,542,285 A 9/1985 Grise
4,626,664 A 12/1986 Grise
4,628,187 A 12/1986 Sekiguchi et al.
4,633,068 A 12/1986 Grise
4,656,339 A 4/1987 Grise
4,661,689 A 4/1987 Harrison
4,665,304 A 5/1987 Spencer
4,713,531 A 12/1987 Fennekels et al.
4,719,335 A 1/1988 Batliwalla et al.
4,725,717 A 2/1988 Harrison
4,743,741 A 5/1988 Ramus
4,752,672 A 6/1988 Grise
4,761,541 A 8/1988 Batliwalla et al.
4,777,351 A 10/1988 Batliwalla et al.
4,845,343 A 7/1989 Aune et al.
4,849,255 A 7/1989 Grise et al.
4,857,711 A 8/1989 Watts
4,868,898 A 9/1989 Seto
4,888,089 A 12/1989 Marstiller et al.
4,892,998 A 1/1990 Marstiller et al.
4,912,306 A 3/1990 Grise et al.
4,923,248 A 5/1990 Feher
4,931,627 A 6/1990 Watts
4,964,674 A 10/1990 Altmann et al.
5,015,824 A 5/1991 Monter et al.
5,019,797 A 5/1991 Marstiller et al.
5,025,136 A 6/1991 Doege et al.
5,034,594 A 7/1991 Beezhold et al.
5,045,673 A 9/1991 Kelly
5,057,674 A 10/1991 Smith-Johannsen
5,081,339 A 1/1992 Stine
5,111,025 A 5/1992 Barma et al.
5,132,840 A 7/1992 Okada et al.
5,155,334 A 10/1992 Marstiller et al.
5,181,006 A 1/1993 Shafe et al.
5,187,350 A 2/1993 Tsuchiya
5,197,595 A 3/1993 Coultas
5,198,639 A 3/1993 Smuckler
5,206,482 A 4/1993 Smuckler
5,335,381 A 8/1994 Chang
5,344,591 A 9/1994 Smuckler
5,354,966 A 10/1994 Sperbeck
5,405,178 A 4/1995 Weingartner et al.
5,414,241 A 5/1995 Ohashi et al.
5,418,025 A 5/1995 Harmand et al.
5,422,462 A 6/1995 Kishimoto
5,432,322 A 7/1995 Ingram et al.
5,451,747 A 9/1995 Sullivan et al.
5,477,033 A 12/1995 Bergholtz
5,516,189 A 5/1996 Ligeras
5,543,601 A 8/1996 Bartrug et al.
5,626,021 A 5/1997 Karunasiri et al.
5,643,480 A 7/1997 Gustavsson et al.
5,679,277 A 10/1997 Niibe et al.
5,702,565 A 12/1997 Wu et al.
5,716,536 A 2/1998 Yokoto et al.
5,796,044 A 8/1998 Cobian et al.
5,800,483 A 9/1998 Vought
5,800,595 A 9/1998 Wright
5,801,914 A 9/1998 Thrash
5,824,993 A 10/1998 Chrysochoos et al.
5,824,994 A 10/1998 Noda et al.
5,824,996 A 10/1998 Kochman et al.
5,851,588 A 12/1998 Uthoff, Jr.
5,861,610 A 1/1999 Weiss
5,897,162 A 4/1999 Humes et al.
5,902,505 A 5/1999 Finley
5,904,874 A 5/1999 Winter
5,921,314 A 7/1999 Schuller et al.
5,948,297 A 9/1999 Haubner et al.
5,961,869 A 10/1999 Irgens
6,031,214 A 2/2000 Bost et al.
6,054,690 A 4/2000 Petit et al.
6,057,530 A 5/2000 Gurevich
6,064,037 A 5/2000 Weiss et al.
6,070,115 A 5/2000 Oestreicher et al.
6,084,217 A 7/2000 Bulgajewski
6,093,910 A 7/2000 McClintock et al.
6,097,009 A 8/2000 Cole
6,111,234 A 8/2000 Batliwalla et al.
6,124,577 A 9/2000 Fristedt
6,143,206 A 11/2000 Handa et al.
6,147,332 A 11/2000 Holmberg et al.
6,150,642 A 11/2000 Weiss et al.
6,164,719 A 12/2000 Rauh
6,172,344 B1 1/2001 Gordon et al.
6,189,487 B1 2/2001 Owen et al.
6,194,692 B1 2/2001 Oberle
6,215,111 B1 4/2001 Rock et al.
6,220,659 B1 4/2001 McDowell et al.
6,229,123 B1 5/2001 Kochman et al.
6,278,090 B1 8/2001 Fristedt et al.
6,294,758 B1 9/2001 Masao et al.
6,307,188 B1 10/2001 Bulgajewski
6,369,369 B2 * 4/2002 Kochman .......... A41D 13/0051
219/528
6,415,501 B1 7/2002 Schlesselman
6,426,485 B1 7/2002 Bulgajewski et al.
6,439,658 B1 8/2002 Ganz et al.
6,452,138 B1 9/2002 Kochman et al.
6,455,823 B1 9/2002 Bulgajewski et al.
6,495,809 B2 12/2002 Bulgajewski et al.
6,501,055 B2 12/2002 Rock et al.
6,512,203 B2 1/2003 Jones et al.
6,559,422 B2 5/2003 Burt
RE38,128 E 6/2003 Gallup et al.
6,619,736 B2 9/2003 Stowe et al.
6,629,724 B2 10/2003 Ekern et al.
6,664,512 B2 12/2003 Horey et al.
6,664,518 B2 12/2003 Fristedt et al.
6,676,207 B2 1/2004 Rauh et al.
6,686,562 B1 2/2004 Weiss et al.
6,710,303 B1 3/2004 Lorenzen
6,713,733 B2 3/2004 Kochman et al.
6,838,647 B2 1/2005 Nagele
6,840,576 B2 1/2005 Ekern et al.
6,857,697 B2 2/2005 Brennan et al.
6,869,139 B2 3/2005 Brennan et al.
6,869,140 B2 3/2005 White et al.
6,872,882 B2 3/2005 Fritz
6,884,965 B2 4/2005 Nelson et al.
6,892,807 B2 5/2005 Fristedt et al.
6,893,086 B2 5/2005 Bajic et al.
6,906,293 B2 6/2005 Schmiz et al.
6,976,734 B2 12/2005 Stoewe
7,036,283 B2 5/2006 Halas
7,040,710 B2 5/2006 White et al.
7,052,091 B2 5/2006 Bajic et al.
7,053,344 B1 5/2006 Surjan et al.
7,083,227 B2 8/2006 Brennan et al.
7,100,978 B2 9/2006 Ekern et al.
7,131,689 B2 11/2006 Brennan et al.
7,147,279 B2 12/2006 Bevan et al.
7,168,758 B2 1/2007 Bevan et al.
7,202,444 B2 4/2007 Bulgajewski
7,205,510 B2 4/2007 Howick
7,213,876 B2 5/2007 Stoewe
7,223,948 B2 5/2007 Howick et al.
7,285,748 B2 10/2007 Nelson et al.
7,301,441 B2 11/2007 Inada et al.
7,306,283 B2 12/2007 Howick et al.

(56) References Cited

U.S. PATENT DOCUMENTS

| | | | | |
|---|---|---|---|---|
| 7,338,117 | B2 | 3/2008 | Iqbal et al. | |
| 7,356,912 | B2 | 4/2008 | Iqbal et al. | |
| 7,370,911 | B2 | 5/2008 | Bajic et al. | |
| 7,475,938 | B2 | 1/2009 | Stoewe et al. | |
| 7,478,869 | B2 | 1/2009 | Lazanja et al. | |
| 7,500,536 | B2 * | 3/2009 | Bulgajewski | H05B 3/34 177/136 |
| 7,506,938 | B2 | 3/2009 | Brennan et al. | |
| 7,510,239 | B2 | 3/2009 | Stowe | |
| 7,560,670 | B2 | 7/2009 | Lorenzen et al. | |
| 7,587,901 | B2 | 9/2009 | Petrovski | |
| 7,618,089 | B2 | 11/2009 | Stoewe et al. | |
| 7,637,569 | B2 | 12/2009 | Krobok et al. | |
| 7,741,582 | B2 | 6/2010 | Howick et al. | |
| 8,456,272 | B2 | 6/2013 | Rauh et al. | |
| 2002/0117495 | A1 | 8/2002 | Kochman et al. | |
| 2004/0100131 | A1 | 5/2004 | Howick et al. | |
| 2005/0242081 | A1 | 11/2005 | Howick | |
| 2006/0015801 | A1 | 1/2006 | Suh et al. | |
| 2006/0138810 | A1 | 6/2006 | Knoll et al. | |
| 2007/0176471 | A1 | 8/2007 | Knoll | |
| 2009/0218855 | A1 | 9/2009 | Wolas | |
| 2010/0035356 | A1 | 2/2010 | Shalyt et al. | |
| 2010/0038356 | A1 | 2/2010 | Fukuda et al. | |
| 2010/0038357 | A1 | 2/2010 | Fukuda et al. | |
| 2010/0122832 | A1 * | 5/2010 | Bukshpun | A41D 1/005 174/110 R |
| 2010/0219664 | A1 | 9/2010 | Howick et al. | |
| 2010/0326976 | A1 | 12/2010 | Nakajima et al. | |
| 2011/0147357 | A1 | 6/2011 | Bokelmann et al. | |
| 2011/0147375 | A1 | 6/2011 | Lomp | |
| 2012/0091112 | A1 | 4/2012 | Wei | |

FOREIGN PATENT DOCUMENTS

| | | | |
|---|---|---|---|
| DE | 199 20 451 | | 12/1999 |
| DE | 10027173 | A1 | 12/2001 |
| EP | 0202896 | A2 | 5/1986 |
| GB | 2010650 | A | 6/1979 |
| JP | 56093284 | A | 7/1981 |
| JP | 57134655 | A | 8/1982 |
| JP | 62109385 | A | 7/1987 |
| JP | 11-24493 | A | 1/1999 |
| JP | 11-218336 | A | 8/1999 |
| JP | 2000333781 | A | 12/2000 |
| JP | 2002050459 | A | 2/2002 |
| JP | 2004055219 | A | 2/2004 |
| WO | 8900480 | A1 | 7/1989 |
| WO | 94/09684 | A1 | 5/1994 |
| WO | 9701549 | A1 | 1/1997 |
| WO | 01/43507 | A1 | 6/2001 |
| WO | 02/06914 | A1 | 1/2002 |
| WO | 03/101777 | | 12/2003 |
| WO | 2005/047056 | | 5/2005 |
| WO | 2010/065411 | A1 | 6/2010 |

OTHER PUBLICATIONS

Automotive Seat Heating Systems, Bauerhin International, received by Assignee W.E.T. Automotive Systems, May 2002.

GMT 830 Heating & Ventilation System, IGB Automotive Ltd., received by Assignee W.E.T. Automotive Systems, Jun. 2003.

* cited by examiner

FABRIC WITH ELECTRICAL FUNCTION ELEMENT

BACKGROUND OF THE INVENTION

The subject matter of the present invention is a fabric according to the preamble of Claim 1. It can be used, for example, for a sensor device, a steering device, a vehicle seat, and, quite generally, for vehicles.

Prior Art

Electrical heating elements, electromagnetic shields and sensors are often hard to position next to one another. This relates particularly to positions with small installation space, as in a steering wheel. In addition, it is expensive to provide electromagnetic shields on electrical conductors.

Therefore, there is a demand for technical solutions that allow a simple, reliable and cost effective arrangement, particularly one involving close mutual proximity.

Subject Matter of The Invention

Against this background, a technical concept having the characteristics of Claim 1 is proposed. Further advantageous embodiments can be obtained from the remaining claims and the following description.

FIGURES

Below, details of the invention are explained. These embodiments are intended to make the invention understandable. However, they only have the character of examples. Obviously, within the framework of the invention defined by the independent claims, one or more described characteristics can also be omitted, modified or completed. Moreover, the characteristics of different embodiments can obviously also be combined with one another. The decisive factor is that the concept of the invention is substantially implemented. If a characteristic is to be at least met in part, this includes that this characteristic is also completely satisfied, or substantially completely met. “Substantially” here means in particular that the implementation allows an achievement of the desired benefit to a recognizable extent. This can mean, in particular, that a corresponding characteristic is at least 50%, 90%, 95% or 99% implemented. If a minimum amount is indicated, then more than this minimum amount can obviously also be used. A description made for an object can also be applied to the predominant portion or the totality of all other similar objects. Unless otherwise indicated, the intervals include their end points. If the number of a component is indicated to be at least one, then this also covers in particular embodiments with two, three or another plurality of components.

Below, reference is made to:

FIG. 1 A motor vehicle with a seat in partial longitudinal section

Figure 2:
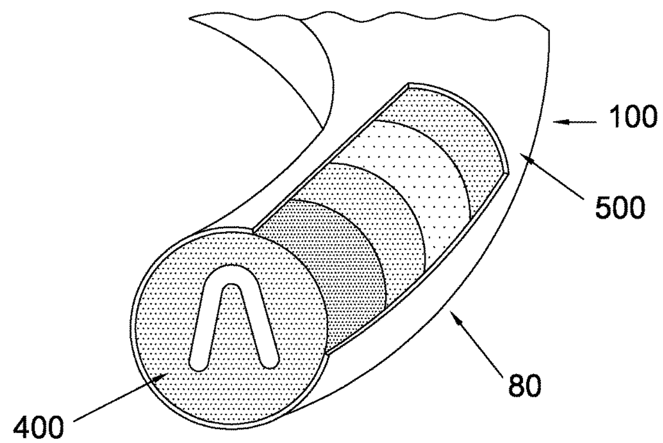
Figure 3A:
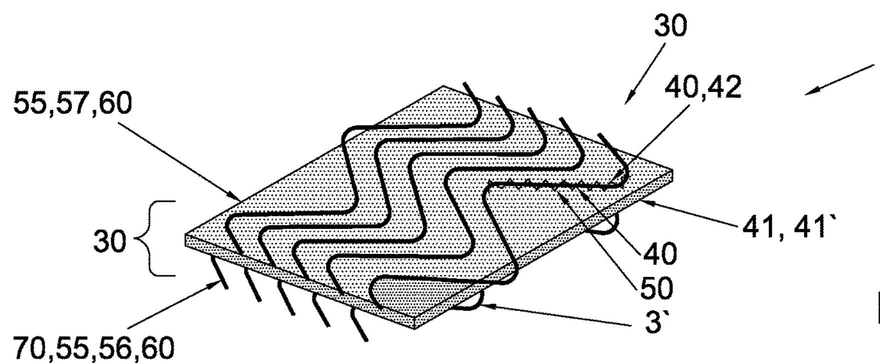
Figure 3B:
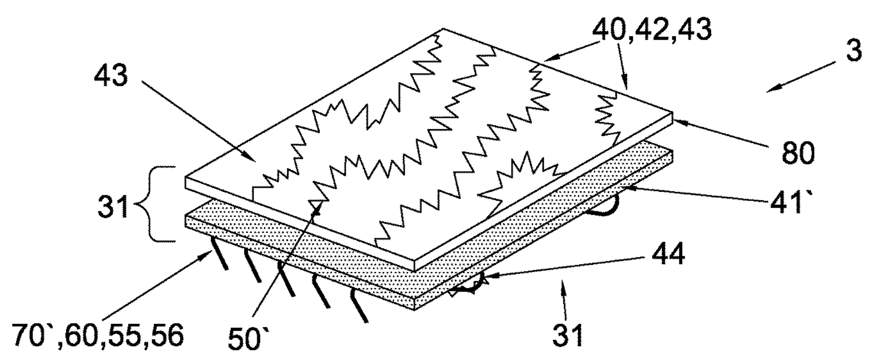

FIG. 2 A cross section through a steering wheel with a sensor and heating device with a fabric according to the invention FIG. 3*a*) A perspective view of a fabric of FIG. 2 with a sensor and shield device in the uninstalled state FIG. 3*b*) A perspective view of an optional additional heating device

DESCRIPTION OF THE INVENTION

FIG. 1 shows a vehicle 1000. This vehicle can be, for example, an airplane, a rail vehicle, a ship or, as in this case, a motor vehicle.

The vehicle 1000 comprises at least one object 10 to be heated or to be monitored. This includes, in case of doubt, all the components with which a user of the passenger cell can come in contact, such as, for example, a seat for vehicles, a dashboard, an arm rest, a door lining, a seat-contact surface, a warming blanket, a roof lining, a cushion 400, a covering 500, or, as in this case, a steering device 100.

The object 10 preferably comprises at least one cushion 400, made from a cushion foam padding, for example, at least one covering 500, made from leather, for example, and/or at least one surface to be heated or to be monitored.

The object 10 preferably comprises at least one heating device 3, 3'. It is used, for example, for heating surfaces that come in contact with the user in the passenger space of a vehicle.

The object 10 preferably comprises at least one sensor device 2. It is used, for example, for the recognition of individuals or mechanical stressing states of surfaces that come in contact with the user in the passenger space of a vehicle.

At least one heating device 3, 3' and/or at least one sensor device 2 comprise(s) a fabric 30, 31.

A fabric 30, 31 is a body that has a substantially larger extent in two dimensions than in regard to a third dimension and/or its thickness. Examples are textiles, films, plates, mattes, nets, three-dimensionally preshaped layers or the like. The fabric is preferably elastic and/or flexible.

The fabric 30 comprises at least one support 41,41'. The latter is preferably flat and made at least partially from a textile, knitted and crocheted fabric, knitted fabric, woven fabric, nonwoven fabric, flexible thermoplastics, air permeable material and/or a film. Here, this can also be the covering 500 or another fabric.

The heating device 3, the sensor device 2 and/or the object 10 comprise in particular at least one electrical function element 70. It is, for example, an electrical conductor or a conducting strand 60 which is arranged on and/or in a support 41,41'. Preferably, a plurality of electrical function elements 70 or conducting strands 60 are provided, which are preferably arranged in a meandering pattern next to one another and/or electrically parallel to each other.

At least one of the fabrics 30, 31 comprises at least one seam 40. A seam denotes a single thread or an associated group of threads, which is arranged along a support 41 after its production and which penetrates at regular or irregular intervals at least partially into the support. A thread denotes a strand made of single filament or multifilament fibers, textile or polymer material or the like.

Preferably at least one seam comprises at least one seam thread 42. Preferably, the seam comprises at least two threads, in particular an upper thread 43 on the top side of the support 41 and a lower thread 44 on the bottom side of the support 41.

The upper and the lower threads are in large part arranged on mutually different surfaces of the fabric 30, 31. They contact, wind around and/or hold one another preferably at puncture sites 50, 50', where at least one of the seam forming threads penetrates into the fabric, in particular it passes through said fabric.

Preferably, the seam 40 secures at least one accompanying strand 55. An accompanying strand denotes a strand which at least partially follows the course of the seam 40 along the support 41, and which is held by at least one sewing thread at least in some sections. A strand is an oblong structure, whose length by far exceeds the dimensions of its cross section. Preferably, this accompanying strand 55 does not penetrate into the support 41, instead it runs predominantly or exclusively as a lower accompanying strand 56 on the bottom side or as an upper accompanying strand 57 on the top side of the support 41.

If the seam 40 secures at least one accompanying strand 55 which represents an electrical function element 70, then this nevertheless allows the integration, using a seam based technique, of the function elements 70 which themselves are not suitable as seam threads, for example, due to their thickness or stiffness.

It is possible to provide that at least one of the strand types (that is at least one upper thread, at least one lower thread, at least one upper accompanying strand and/or one lower accompanying strand) comprises at least one electrical function element 70 and/or at least one electrically conductive conducting strand 60 or is formed exclusively by it/them. Such a conducting strand 60 can be, for example, a heating strand, a contacting strand, an electrical fuse, a sensor conductor, a shielding conductor and/or a connecting conductor.

It is also possible to provide that several of the four mentioned strand types comprise at least one function element 70 or at least one conducting strand 60. For example, as in FIG. 3*a*), an upper thread 43 can comprise a sensor conductor or be formed by it. An associated lower thread 44 can have a shielding strand opposite a heating device 3 arranged under the support 44, or a heating strand. The resulting fabric can be used as a shielded person detector or, for example, as heating device and simultaneously as a sensor device. If conducting strands of identical function are arranged both on and under the support 41,41', this increases the power that is thus available, for example, the heating power density of the heating device. It is also possible to sew twice as many heating strands in one work step. The fabrics 30, 31 with at least one support 41, 41', at least one seam 40, and at least two electrical function elements can be manufactured more efficiently in this manner, if at least two electrical function elements 70 are in the form of strands and integrated in the seam 40.

If at least two of the electrical function elements 70 are arranged on mutually different sides of the support 41, then uninsulated or mutually influencing function elements 70 can thus also be installed in near proximity to one another in a simple and reliable manner.

It is also possible to provide that one strand type comprises several different strands, in particular several different conducting strands or strands that are used at least temporarily for mutually differing functions. For example, an upper thread can comprise a heating conducting strand for heating, and, for the control thereof, a sensor conducting strand running parallel to said heating conducting strand. Or a sensor conducting strand in an upper accompanying strand can be protected from mechanical stresses by a load removal strand which is also arranged in the upper accompanying strand.

It is also possible to provide that several strand types have an identical function or conducting strands 60 with identical function. This relates particularly to the seam threads arranged in each case on the same side of a support and to an accompanying strand. For example, if both the lower thread of a support 41' and also the lower accompanying strand held by said lower thread are heating strands, then the current load capacity and the reliability of the resulting construction are increased, in particular if they are not insulating and electrically connected to one another.

Preferably at least one thread of the seam and at least one accompanying strand 55 secured by means of this thread have at least temporarily mutually differing electrical functions. For example, an accompanying strand can be a heating strand, and the seam thread supporting the same can be a grounded electrical shielding conducting strand.

If the available surface is not sufficient, or if more than two planes are required for the arrangement of all the required electrical function elements 70, then several supports 41,41' can also be used, and arranged one above the other. Their connection to each other can occur, for example, via an adhesive layer 80, via corresponding connection seams or not at all.

Conducting strands preferably comprise metal and/or electrically conductive strands or are formed by them. However, monofilaments or other structures can also be used.

In a particularly preferred embodiment, two supports 41,41' are arranged one above the other with at least partial mutual overlap. Each one of the supports carries at least one seam, in each case with upper and lower threads. An accompanying strand is associated with each thread. An outer upper accompanying strand is used as heating strand, and a lower accompanying strand located beneath is used as shielding. A lower accompanying strand arranged on the other support is used as sensor. The fourth strand is available for additional functions or for reinforcing the above-mentioned functions.

The invention allows a drastic shortening of manufacturing times, it replaces an expensive and environmentally polluting metallization of textiles, and it eliminates the need for lamination processes. In addition, the product with its different planes can be used very flexibly. In a first operating state, the mentioned functions can be assigned to other function elements or to other planes simply by electrical means, for example, by exchanging the connections.

This means, for example, that at least one electrical function element 70 fulfills a first electrical function in a first operating state, and, in an additional operating state, it fulfills a second electrical function that is physically different from the first one, for example, by a cycled alternation between heating function and sensor function.

It is also possible to provide that at least one electrical function element 70 is in operation, while at least one additional electrical function element 70' is switched off.

The fabric or a heating device, sensor device and/or steering device produced therefrom can be operated, for example, so that heating conducting strands are heated in a heating phase. In a detection phase, the heating current can be switched off, and instead a ground or another potential can be applied, in order to protect the sensor strands that run in parallel in this phase from undesired electromagnetic radiation. This is particularly important if the sensor should detect whether or not a driver has his/her hands on a steering wheel. This is due, on the one hand, to the great importance in terms of safety technology, and, on the other hand, to the relatively low weight of the hands compared to the entire body of a person. Here, the heating and the sensor function can be taken over by the same strands or assigned to mutually differing strands.

In addition or alternatively it can be advantageous if at least one support also comprises electrically or electromagnetically acting components, for example, ferrites. As a result, the use of additional shielding material and additional lamination processes can be avoided.

Preferably, a fabric according to the invention is arranged between a covering and a supporting structure or between a covering and a cushion of a steering wheel. Such a steering wheel is heatable. In addition, it is possible to detect whether or not a user has his/her hands on the steering wheel. This is useful for the adaptation of the control between a driver and an autopilot or a parking sensor.

REFERENCE NUMERALS

2 Sensor device
3, 3' Heating device
10 Object
30, 31 Fabric
40 Seam
41, 41' Support
42 Seam thread
43 Upper thread
44 Lower thread
50, 50' Puncture sites
55 Accompanying strand
56 Lower accompanying strand
57 Upper accompanying strand
60 Conducting strand
70, 70' Electrical function element
80 Adhesive layer
100 Steering device
400 Cushion
500 Covering
1000 Vehicle

The invention claimed is:

1. A method comprising:

providing at least one fabric including:

a) at least one support;

b) at least two electrical function elements; and c) at least one seam;

wherein the at least two electrical function elements are in the form of strands and the at least two electrical function elements are integrated into the at least one seam, wherein the method includes a step of operating at least one of the at least two electrical function elements, while at least one additional electrical function element is switched off.

2. The method according to claim 1, wherein at least one of the at least two electrical function elements is an accompanying strand secured by the at least one seam; and wherein the at least two electrical function elements are arranged on mutually different sides of the support.

3. The method of claim 2, wherein the at least one seam comprises at least one seam thread.

4. The method of claim 2, wherein the at least one seam comprises at least two seam threads.

5. The method of claim 4, wherein the at least two seam threads are an upper seam thread and a lower seam thread and are primarily on mutually different surfaces of the support.

6. The method of claim 5, wherein at least one of the at least two seam threads penetrate through the support one or more puncture sites.

7. A method comprising:

providing at least one fabric including:

a) at least one support;

b) at least two electrical function elements; and c) at least one seam;

wherein the at least two electrical function elements are in the form of strands and the at least two electrical function elements are integrated into the at least one seam, wherein the method includes a step of operating in a first operating state, one of the at least two electrical function elements that fulfills a first electrical function, and, in a second operating state, a second of the at least two electrical function elements fulfills a second electrical function which is physically different from the first function.

8. A fabric comprising;

a) at least one support;

b) at least two electrical function elements; and c) at least one seam with at least two seam threads;

wherein the at least two electrical function elements are in the form of strands and the at least two electrical function elements are integrated into the at least one seam;

wherein at least one of the at least two electrical function elements is an accompanying strand secured by the at least one seam;

wherein the at least two electrical function elements are arranged on mutually different side of the support;

wherein the at least one seam comprises at least two seam threads, the at least two seam threads being an upper seam thread and a lower seam thread that are primarily on mutually different side of the fabric and penetrate through the support at one or more puncture sites;

wherein the one accompanying strands is now two accompanying strands that are a lower accompanying strand and an upper accompanying strand, wherein the upper accompanying strand and the lower accompanying strand are on mutually different sides of the fabric and do not penetrate into the support;

wherein the lower accompanying strand runs predominantly along the bottom side of the support and the upper accompanying strand runs predominantly along the top side of the support; and wherein the upper accompanying strand and the lower accompanying strand are secured by:

i) the upper seam thread;

ii) the lower seam thread; or iii) both the upper seam thread and the lower seam thread.

9. A heating device, wherein the heating device comprises at least one fabric according to claim 8.

10. A sensor device, wherein the sensor device comprises at least one fabric according to claim 8.

11. A steering device, wherein the steering device comprises at least one fabric according to claim 8.

12. A vehicle seat, wherein the vehicle seat comprises at least one fabric according to claim 8.

13. The fabric of claim 8, wherein the upper seam thread and the lower seam thread contact, wind around, and hold one another.

14. The fabric of claim 8, wherein one of the at least two electrical function elements is at least one of the following:

i) a heating strand;

ii) a contacting strand;

iii) an electrical fuse;

iv) a sensor conductor;

v) a shielding conductor; and vi) a connecting conductor.

15. The fabric of claim 14, wherein the upper accompanying strand on the top side of the support is a sensor conductor and the lower accompanying strand on the bottom side of the support is a heater so that the fabric is a heating device and a sensor device.

16. The fabric of claim 14, wherein one of the at least two electrical function elements are integrated into at least one of the at least two seam threads.

17. The fabric of claim 16, wherein the at least two electrical function elements are at least four electrical functional elements;

wherein the upper accompanying strand on the top side of the support is the heating strand and the upper seam thread is an electrical shielding conductor, and the lower accompanying strand is a sensor conductor and the lower seam thread is a contacting strand, forming a shielded person detector and a heating and sensing device.

18. A vehicle, wherein the vehicle comprises at least one fabric according to claim 8.

19. The fabric of claim 16, wherein an adhesive layer is attached to one side of the support.

20. The fabric of claim 19, wherein at least one of the two seam threads penetrates through the adhesive layer.

* * * * *

UNITED STATES PATENT AND TRADEMARK OFFICE

CERTIFICATE OF CORRECTION

PATENT NO. : 9,821,832 B2
APPLICATION NO. : 13/792887
DATED : November 21, 2017
INVENTOR(S) : Oliver Davignon and Gábor Panyi It is certified that error appears in the above-identified patent and that said Letters Patent is hereby corrected as shown below:

On the Title Page

Page 3, item (56), Foreign Patent Documents, delete "WO 8900480" and replace with --WO 8906480--

In the Claims

Column 5, Claim 6, Line 55, delete "support one" and replace with --support at one--

Column 6, Claim 8, Line 19, delete "side" and replace with --sides--

Column 6, Claim 8, Line 23, delete "side" and replace with --sides--

Column 6, Claim 8, Line 25, delete "strands" and replace with --strand--

Column 7, Claim 19, Line 13, delete dependency from "Claim 16" and replace with dependency from --Claim 8--

Signed and Sealed this
Thirty-first Day of July, 2018

Andrei Iancu
*Director of the United States Patent and Trademark Office*